(12) United States Patent
Wang et al.

(10) Patent No.: US 12,012,510 B2
(45) Date of Patent: Jun. 18, 2024

(54) FOAMABLE ACRYLIC COMPOSITION

(71) Applicant: Arkema France, Colombes (FR)

(72) Inventors: Jing-Han Wang, King of Prussia, PA (US); Nathan J. Bachman, West Chester, PA (US); Brian M. Cromer, Wayne, PA (US)

(73) Assignee: ARKEMA FRANCE, Colombes (FR)

( * ) Notice: Subject to any disclaimer, the term of this patent is extended or adjusted under 35 U.S.C. 154(b) by 149 days.

(21) Appl. No.: 16/768,131

(22) PCT Filed: Nov. 29, 2018

(86) PCT No.: PCT/US2018/062944
§ 371 (c)(1),
(2) Date: May 29, 2020

(87) PCT Pub. No.: WO2019/108721
PCT Pub. Date: Jun. 6, 2019

(65) Prior Publication Data
US 2020/0385564 A1    Dec. 10, 2020

Related U.S. Application Data

(60) Provisional application No. 62/593,460, filed on Dec. 1, 2017.

(51) Int. Cl.
| | | |
|---|---|---|
| *C08L 33/12* | (2006.01) | |
| *C08J 9/00* | (2006.01) | |
| *C08J 9/06* | (2006.01) | |
| *C08J 9/32* | (2006.01) | |
| B29C 70/48 | (2006.01) | |
| B29K 33/00 | (2006.01) | |
| B29K 105/04 | (2006.01) | |
| B29K 105/16 | (2006.01) | |
| B29K 507/04 | (2006.01) | |

(52) U.S. Cl.
CPC ............ *C08L 33/12* (2013.01); *C08J 9/0085* (2013.01); *C08J 9/06* (2013.01); *C08J 9/32* (2013.01); *B29C 70/48* (2013.01); *B29K 2033/12* (2013.01); *B29K 2105/04* (2013.01); *B29K 2105/162* (2013.01); *B29K 2507/04* (2013.01); *B29K 2995/0005* (2013.01); *B29K 2995/0063* (2013.01); *C08J 2203/22* (2013.01); *C08J 2333/12* (2013.01)

(58) Field of Classification Search
CPC .. C08L 33/12; C08J 9/0085; C08J 9/32; C08J 9/06; C08J 2203/22; C08J 2333/12; C08J 9/0066; B29C 70/48; B29C 44/3415; B29C 44/445; B29C 70/28; B29K 2033/12; B29K 2105/04; B29K 2507/04; B29K 2995/0005; B29K 2105/48; C08F 265/06; C08K 9/08
USPC ............................................. 524/404
See application file for complete search history.

(56) References Cited

U.S. PATENT DOCUMENTS

| | | |
|---|---|---|
| 4,855,170 A | 8/1989 | Darvell |
| 5,532,284 A | 7/1996 | Bartlett et al. |
| 6,103,152 A | 8/2000 | Gehlsen et al. |
| 6,613,810 B1 * | 9/2003 | Ejiri .......................... B01J 13/14 521/56 |
| 6,797,371 B1 | 9/2004 | Gehlsen et al. |
| 7,858,002 B2 | 12/2010 | Okamoto et al. |
| 7,879,441 B2 | 2/2011 | Gehlsen et al. |
| RE45,747 E | 10/2015 | Gehlsen et al. |
| 9,777,140 B2 | 10/2017 | Gerard et al. |
| 10,414,846 B2 | 9/2019 | Gerard et al. |
| 2004/0197545 A1 | 10/2004 | Gehlsen et al. |
| 2005/0045855 A1 | 3/2005 | Tonapi et al. |
| 2011/0250446 A1 | 10/2011 | Higuchi et al. |
| 2012/0121900 A1 | 5/2012 | Niwa et al. |
| 2013/0029147 A1 | 1/2013 | Miki et al. |
| 2014/0166572 A1 * | 6/2014 | Snyder .................. B01D 39/18 210/507 |

(Continued)

FOREIGN PATENT DOCUMENTS

| | | |
|---|---|---|
| EP | 0 257 984 A2 | 3/1988 |
| JP | 2004002719 A | 1/2004 |
| JP | 2017149980 A | 8/2017 |
| JP | 6200746 B2 | 9/2017 |
| WO | 2017/043156 A1 | 3/2017 |

OTHER PUBLICATIONS

Extended European Search Report dated Dec. 13, 2021, issued by the European Patent Office in corresponding European Application No. 18 884 574.7-1107, (15 pages).
Supplementary European Search Report dated Dec. 5, 2021, issued by the European Patent Office in corresponding European Application No. 18 88 4574, (6 pages).

(Continued)

*Primary Examiner* — Hannah J Pak
(74) *Attorney, Agent, or Firm* — BUCHANAN, INGERSOLL & ROONEY PC

(57) ABSTRACT

The invention relates to foamed acrylic materials using both traditional chemical blowing agents as well as foamable microspheres. The acrylic foams have improved density reduction, optical properties, and insulation properties. The acrylic foams of the invention can be formed by traditional melt processing methods (extrusion, blow molding, etc.) as well as innovative foaming methods, such as foaming during or after polymerization. One novel method of the invention involves the use of expandable microspheres blended with monomers, the monomers then polymerized through bulk polymerization in cell cast, infusion, or compression molding processes. This method can be effectively used to produce composite foam structures, such as in combination with ELIUM® liquid resins from Arkema.

4 Claims, 1 Drawing Sheet

(56) References Cited

U.S. PATENT DOCUMENTS

| | | | |
|---|---|---|---|
| 2014/0256850 A1* | 9/2014 | Gerard | C08J 5/247 |
| | | | 523/222 |
| 2015/0322226 A1 | 11/2015 | Nordin | |
| 2017/0335083 A1 | 11/2017 | Vaikhanski et al. | |
| 2018/0112115 A1 | 4/2018 | Hamada | |
| 2019/0077116 A1 | 3/2019 | Kitade et al. | |
| 2021/0246243 A1* | 8/2021 | Dubois | C08J 11/10 |
| 2023/0279214 A1* | 9/2023 | Wang | B29C 70/28 |
| | | | 524/404 |

* cited by examiner

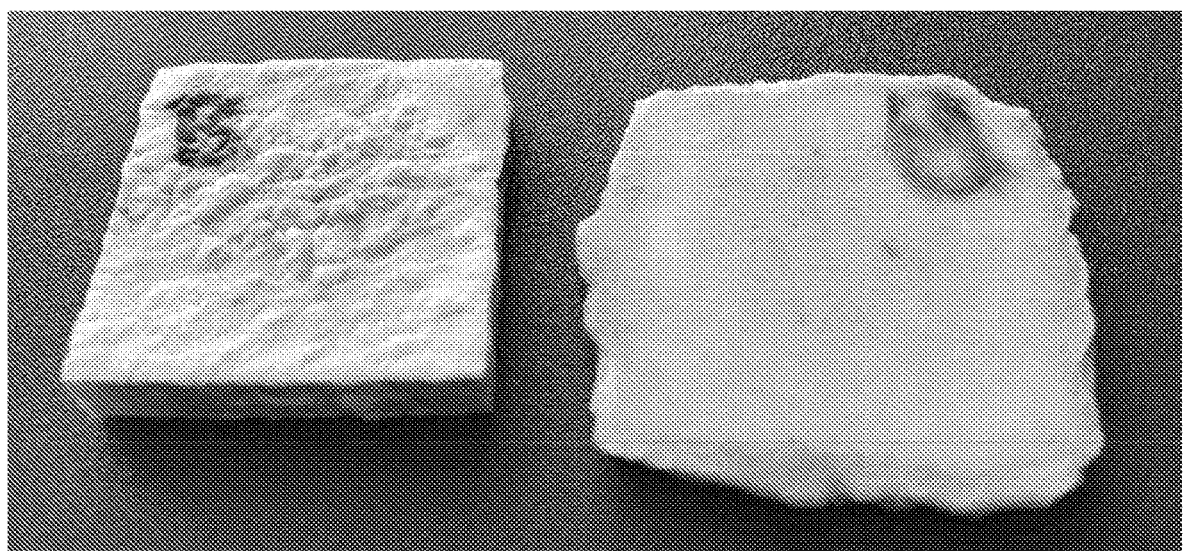

FOAMABLE ACRYLIC COMPOSITION

This application claims benefit, under U.S.C. § 119 or § 365 of PCT Application No. PCT/US2018/062944, filed Nov. 29, 2018; and U.S. Provisional Application No. 62/593,460, filed Dec. 1, 2017; said applications incorporated herein by reference.

FIELD OF THE INVENTION

The invention relates to foamed acrylic materials using both traditional chemical blowing agents as well as foamable microspheres. The acrylic foams have improved density reduction, optical properties, and insulation properties. The acrylic foams of the invention can be formed by traditional melt processing methods (extrusion, blow molding, etc.) as well as innovative foaming methods, such as foaming during or after polymerization. One novel method of the invention involves the use of expandable microspheres blended with monomers, the monomers then polymerized through bulk polymerization in cell cast, infusion, or compression molding processes. This method can be effectively used to produce composite foam structures.

BACKGROUND OF THE INVENTION

Traditionally foamed polymers were generated using chemical or physical blowing agents. In the case of the chemical blowing agent, the gas is created by decomposition of a chemical by heating it above its degradation temperature. In the case of the physical blowing agent, gas is introduced into the polymer either directly or through evaporating a liquid foaming agent by heating it above its evaporation temperature. Either type of foaming agents can be used in both continuous or batch foaming processes although batch process mainly use physical blowing agents. Chemical blowing agents are mainly used for higher density foams—down to 50% density reduction, while physical blowing agents can produce light foams—upwards of 10× density reduction.

Currently available foamed plastic sheet products include foamed PVC, foamed polystyrene, and aluminum composite materials. Foamed PVC has a tendency to warp when temperature changes due to high internal stress and has poor weatherability. Foamed polystyrene has dimples on the surface. Aluminum composite materials delaminates constantly and has poor printability. Due to the deficiencies of foamed PVC, foamed polystyrene, and aluminum composite, there are demands in the market for foamed acrylic materials.

Acrylics are preferred thermoplastic materials over other plastics due to superior weatherability, glossy surface, and printability. There is a need for foamed acrylic materials for use on an industrial scale.

Recently a new means of foaming amorphous and semi-crystalline polymers has been developed, in the form of expandable microspheres. U.S. Pat. No. 7,879,441 describes a foam article prepared by adding expandable microspheres to a polymer matrix in an extruder. The mixture may either be expanded in the extruder—producing a foamed article, or can remain relatively unexpanded, and foamed-in-place. The application is mainly for adhesive tapes. U.S. 2015/0322226 also describes the use of microspheres for foaming polymers.

The microspheres are small hollow particles with a polymer shell that can encapsulate various liquids or gases. Upon heating, the polymer shell will soften and the liquid inside the sphere evaporates to create a large volume of gas with high pressure—which will expand the microsphere substantially. The spheres can have various diameters (typically with a wide size distribution), shell thickness, shell composition (typically lightly cross linked acrylates, methacrylates and their copolymers with acrylonitrile), and can contain various liquids or gases (typically, isooctane, isobutene, isopentane or mixtures of thereof). The microspheres can additionally contain finely dispersed organic or non-organic material both inside and on the surface. Microspheres are commercially available from several manufacturers in a wide range of particle size and distributions. Generally the microspheres have an average particle diameter of less than 10 micron with a shell thickness of several micron before expansion and average diameter of tens of micron with shell thickness of less than one micron after expansion are typical.

Durable, strong, lightweight materials are desired as replacements for steel and other metals. Recently Arkema has introduced acrylic/fiber composite thermoplastic materials formed from a (meth)acrylic monomer/(meth)acrylic polymer/initiator liquid blend and long fibers, as described in U.S. Pat. No. 9,777,140. These strong materials have the appearance and weatherability of acrylics, but unlike typical thermoset composites, the thermoplastic acrylic composites can be thermoformed, and can be recycled.

SUMMARY OF THE INVENTION

The invention relates to (meth)acrylic foams and foam composites, including novel production and processes for foaming.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Aspects of the invention include:
1. A polymeric foamed composite material comprising:
   (a) a foamed polymeric thermoplastic (meth)acrylic matrix
   (b) a fibrous material as reinforcement
   wherein the fibrous material comprises either a fiber with an aspect ratio of the fiber of at least 1000 or the fibrous material has a two dimensional macroscopic structure, and wherein the density of the foamed polymeric thermoplastic (meth)acrylic matrix is at least 5, preferably 10, preferably 20, preferably 30, more preferably 50, more preferably 70, more preferably 90 weight percent less than an unfoamed polymeric thermoplastic (meth)acrylic matrix of the same composition.
2. The polymeric foamed composite material of aspect 1, wherein said fibers are selected from the group consisting of natural materials, vegetable fibers, wood fibers, animal fibers mineral fibers, sisal, jute, hemp, flax, cotton, coconut fibers, banana fibers, wool, hair, aliphatic polyamides, aromatic polyamides, polyesters, polyvinylalcohol, polyolefins, polyurethanes, polyvinylchloride, polyethylene, unsaturated polyesters, epoxy resins, vinylesters, mineral fibers, glass fibers, carbon fibers, boron fibers, silica fibers.
3. The polymeric foamed composite material of any of aspects 1 and 2, wherein said (meth)acrylic matrix polymer comprises at least 70 weight percent of methyl methacrylate monomer units.

4. The polymeric foamed composite material of any of aspects 1 to 3, further comprising 0.1 to 10 weight percent of residual expandable microspheres—based on the weight of the polymeric thermoplastic (meth)acrylic matrix.

5. A liquid (meth)acrylic syrup comprising:
   a) a (meth)acrylic polymer,
   b) a (meth)acrylic monomer,
   c) at least one initiator or initiating system for starting the polymerization of the (meth) acrylic monomer,
   d) at least one foaming agent
   said liquid (meth)acrylic syrup having a dynamic viscosity in the range from 10 mPa*s to 10000 mPa*s, preferably from 50 mPa*s to 5000 mPa*s and advantageously from 100 mPa*s to 1000 mPa*s.

6. The liquid (meth)acrylic syrup of aspect 5, wherein said foaming agent comprises at least one chemical foaming agent.

7. The liquid (meth)acrylic syrup of any of aspects 5 and 6, wherein said chemical foaming agent is selected from the group consisting of azodicarbonamide, azodiisobutyronitrile, sulfonylsemicarbazide, 4,4-oxybenzene, barium azodicarboxylate, 5-Phenyltetrazole, p-toluenesulfonylsemicarbazide, diisopropyl hydrazodicarboxylate, 4,4'-oxybis(benzenesulfonylhydrazide), diphenylsulfone-3,3'-disulfohydrazide, isatoic anhydride, N,N'-dimethyl-N,N'dinitroterephthalamide, citric acid, sodium bicarbonate, monosodium citrate, anhydrous citric acid, trihydrazinotriazine, N,N'-dinitrosopentamethylenetetramine, p-toluenesulfonylhydrazide, and blends thereof.

8. The liquid (meth)acrylic syrup of aspects 5 to 7, wherein said foaming agent comprises expandable microspheres.

9. A thermoplastic (meth)acrylic foam article comprising a (meth)acrylic matrix with a density reduction of at least 33%, at least 75%, at least 90%, compared to a non-foamed (meth)acrylic article of the same composition.

10. The thermoplastic (meth)acrylate foamed article of aspect 9, comprising thermoplastic (meth)acrylate matrix comprises 0.1 to 10, preferably 1 to 5, weight percent of nanoparticles.

11. The thermoplastic (meth)acrylate foamed article of any of aspects 9 and 10, wherein said nanoparticles are conductive nanoparticles.

12. The thermoplastic (meth)acrylate foamed article of any of aspects 9 to 11, comprising a (meth)acrylic sheet having a k factor of less than 0.7, preferably less than 0.5, more preferably less than 0.25 at 25° F.

13. The thermoplastic (meth)acrylate foamed article of aspects 9 to 12, having a class A surface, as measured by ASTM E340.

14. A process for forming a (meth)acrylic foam comprising the steps of
   a. blending a foaming agent, (meth)acrylic monomers, (meth)acrylic polymer and one or more initiators to form a liquid (meth)acrylic syrup having a dynamic viscosity in the range from 10 mPa*s to 10000 mPa*s, preferably from 50 mPa*s to 5000 mPa*s and advantageously from 100 mPa*s to 1000 mPa*s,
   b. forming a structure by polymerization of the liquid (meth)acrylic syrup.

15. The process of aspect 14, wherein foaming occurs simultaneously with the polymerization process, to form a foamed structure.

16. The process of any of aspects 14 or 15, wherein said structure is foamed after polymerization by the addition of energy capable of enabling the foaming agent to expand.

17. The process of any of aspects 14 to 16, wherein said foaming agent comprises at least one chemical foaming agent.

18. The process of any of aspects 14 to 17, wherein said foaming agent comprises expandable microspheres.

19. The process of any of aspects 14 to 18, wherein said structure formation is performed by cell cast, solid state casting, vacuum infusion, pultrusion, wet compression molding, resin transfer molding, compression resin transfer molding, lay-up/spray-up; or filament winding.

20. The process of any of aspects 14 to 19, wherein said liquid (meth)acrylic syrup is combined with long fiber with an aspect ratio of the fiber of at least 1000 or the fibrous material has a two or three dimensional dimensional macroscopic structure, prior to polymerization.

21. The process of any of aspects 14 to 20, wherein said combination of long fibers and liquid (meth)acrylic syrup occurs by Gravure coating, immersion dip coating, slot die coating, curtain coating, or gap coating.

22. A process for forming a (meth)acrylic foam having improved surface appearance, as measured by ASTM E340, comprising the steps of:
   a) forming a thermoplastic (meth)acrylic foamed article in a mold, wherein said thermoplastice (meth)acrylic foamed article comprises expandable microspheres,
   b) curing said article
   c) enlarging the size of the mold by either opening the mold slightly, or by moving the cured article into a slightly larger mold,
   d) adding additional heat to the article, causing it to further expand to fill the larger mold, e) cooling the article, and
   f) demold the article.

23. The polymeric foamed composite material of aspect 1, wherein said material is an article for use as an automobile part, boat part, train part, sport article, plane part, helicopter part, space ship part, rocket part, photovoltaic module part, wind turbine part, furniture part, construction part, building part, telephone or cell phone part, computer or television part, printer part or photocopy part.

BRIEF DESCRIPTION OF THE DRAWINGS

FIG. 1 shows two molded parts of the invention, the part on the left is formed by regular compression molding, as in Example 3. The part of the right is formed by the Example 4 process to achieve a class "A" surface.

DETAILED DESCRIPTION OF THE INVENTION

Problems to Solve:

There is a desire to produce an acrylic foamed material, having an improved density reduction, excellent optical properties, and/or good mechanical properties. There is also a desire for a foamed acrylic composite having the advantages of thermoplastic acrylic composites, at a higher strength to weight ratio by lowering density while maintaining sufficient mechanical properties Solution:

Acrylic foams have now been formed by combining blowing agents into a liquid acrylic syrup that can then be polymerized and foamed. The foaming can occur during or after polymerization, providing production flexibility, as well as an improvement in optical and/or mechanical properties. The acrylic foam can be combined with long fibers to form composites with improved strength to weight ratios, weldability, thermoformability, and recyclability.

"Copolymer" as used herein, means a polymer having two or more different monomer units. "Polymer" is used to mean both homopolymer and copolymers. For example, as used herein, "PMMA" and "polymethyl methacrylate" are used to connote both the homopolymer and copolymers, unless specifically noted otherwise. (Meth)acrylate is used to connote both acrylates and methacrylates, as well as mixtures of these. Polymers may be straight chain, branched, star, comb, block, or any other structure. The polymers may be homogeneous, heterogeneous, and may have a gradient distribution of co-monomer units. All references cited are incorporated herein by reference.

As used herein, unless otherwise described, percent shall mean weight percent. Molecular weight is a weight average molecular weight as measured by GPC. In cases where the polymer contains some cross-linking, and GPC cannot be applied due to an insoluble polymer fraction, soluble fraction/gel fraction or soluble fraction molecular weight after extraction from gel is used.

Liquid Acrylic Resin:

The liquid acrylic resin of the invention, also called a liquid acrylic syrup, is a viscous, polymerizable blend of (meth)acrylic polymer(s), (meth)acrylic monomer(s), and initiator.

(Meth)Acrylic Polymer:

In one embodiment the (meth)acrylic polymer comprises at least 70%, by weight of methyl methacrylate.

In another embodiment the PMMA is a mixture of at least one homopolymer and at least one copolymer of MMA, or a mixture of at least two homopolymers or two copolymers of MMA with a different average molecular weight or a mixture of at least two copolymers of MMA with a different monomer composition.

The copolymer of methyl methacrylate (MMA) comprises from 70% to 99.7% by weight of methyl methacrylate and from 0.3 to 30% by weight of at least one monomer having at least one ethylenic unsaturation that can copolymerize with methyl methacrylate.

These monomers are well known and mention may be made, in particular of acrylic and methacrylic acids and alkyl(meth)acrylates in which the alkyl group has from 1 to 12 carbon atoms. As examples, mention may be made of methyl acrylate and ethyl, butyl or 2-ethylhexyl (meth)acrylate. Preferably the comonomer is an alkyl acrylate in which the alkyl group has from 1 to 4 carbon atoms.

In a preferred embodiment the copolymer of methyl methacrylate (MMA) comprises from 70% to 99.7%, preferably from 80% to 99.7% advantageously from 90% to 99.7% and more advantageously from 90% to 99.5% by weight of methyl methacrylate and from 0.3% to 30%, preferably from 0.3% to 20% advantageously from 0.3% to 10% and more advantageously from 0.5% to 10% by weight of at least one monomer having at least one ethylenic unsaturation that can copolymerize with methyl methacrylate. Preferably the comonomer is chosen from methyl acrylate or ethyl acrylate or mixtures thereof.

The weight average molecular weight of the (meth)acrylic polymer should be high, meaning larger than 50000 g/mol, preferably larger than 100,000 g/mol.

The weight average molecular weight can be measured by size exclusion chromatography (SEC).

(Methacrylic) Monomer:

The (meth)acrylic polymer is dissolved in one or more (meth)acrylic monomers. The monomer(s) are chosen from acrylic acid, methacrylic acid, alkyl acrylic monomers, alkyl methacrylic monomers and mixtures thereof.

Preferably the monomer is chosen from acrylic acid, methacrylic acid, alkyl acrylic monomers, alkyl methacrylic monomers and mixtures thereof, the alkyl group having from 1 to 22 carbons, either linear, branched or cyclic; preferably the alkyl group having from 1 to 12 carbons, either linear, branched or cyclic.

Advantageously the (meth)acrylic monomer is chosen from methyl methacrylate, ethyl methacrylate, methyl acrylate, ethyl acrylate, methacrylic acid, acrylic acid, n-butyl acrylate, iso-butyl acrylate, n-butyl methacrylate, iso-butyl methacrylate, cyclohexyl acrylate, cyclohexyl methacrylate, isobornyl acrylate, isobornyl methacrylate and mixtures thereof.

More advantageously the monomer is chosen (meth)acrylic monomer is chosen from methyl methacrylate, isobornyl acrylate or acrylic acid and mixtures thereof.

In a preferred embodiment at least 50 wt %, of the monomer is methyl methacrylate.

In a more preferred embodiment at least 50 wt %, of the monomer is a mixture of methyl methacrylate with isobornyl acrylate and/or acrylic acid.

The (meth)acrylic monomer or the (meth)acrylic monomers in the liquid (meth) acrylic syrup present at least 40% by weight, preferably 50% by weight, advantageously 60% by weight and more advantageously 65% by weight of total liquid (meth) acrylic syrup in view of (meth)acrylic monomer and (meth)acrylic polymer.

The (meth)acrylic monomer or the (meth)acrylic monomers in the liquid (meth) acrylic syrup present at most 90% by weight, The (meth)acrylic polymer or polymers in the liquid (meth) acrylic syrup present at least 10% by weight, The (meth)acrylic polymer or polymers in the liquid (meth) acrylic syrup present at most 60% by weight, The (meth)acrylic monomer or the (meth)acrylic monomers in the liquid (meth) acrylic syrup presents from 40% to 90% by weight, preferably from 50% to 90% by weight, of total liquid syrup in view of (meth)acrylic monomer and (meth)acrylic polymer.

Accordingly (meth)acrylic polymer or polymers in the liquid (meth) acrylic syrup presents from 60% to 10% by weight, preferably from 50% to 10% by weight, of total liquid syrup in view of (meth)acrylic monomer and (meth)acrylic polymer.

The dynamic viscosity of the liquid (meth) acrylic syrup is in a range from 10 mPa*s to 10,000 mPa*s, preferably from 50 mPa*s to 5000 mPa*s and advantageously from 100 mPa*s to 1000 mPa*s. The viscosity of the syrup can be easily measured with a Rheometer or viscosimeter. The dynamic viscosity is measured at 25° C. The liquid (meth) acrylic syrup has a Newtonian behaviour, meaning no shear thinning, so that the dynamic viscosity is independent of the shearing in a rheometer or the speed of the mobile in a viscosimeter.

Initiator:

Regarding the initiator or initiating system for starting the polymerization of the (meth) acrylic monomer, one could mention initiators or initiating systems that are activated by heat.

The heat activated initiator is preferably a radical initiator. The radical initiator can be chosen from diacyl peroxides, peroxy esters, dialkyl peroxides, peroxyacetals or azo compounds.

Preferably the initiator or initiating system for starting the polymerization of the (meth) acrylic monomer is chosen from peroxides having 2 to 20 carbon atoms The content of radical initiator with respect to the (meth) acrylic monomer of a liquid (meth) acrylic syrup is from 100 to 50,000 ppm by weight (50,000 ppm=5 wt %), preferably between 200 and 40,000 ppm by weight and advantageously between 300 and 30000 ppm.

In one embodiment an inhibitor is present to prevent the monomer from spontaneously polymerising.

Blowing Agent:

Blowing agents useful in the invention include chemical blowing agents, and expandable microspheres.

Unexpanded microspheres are crosslinked acrylic copolymer (acrylonitrile and MMA) shells containing isopentane blowing agent. The isopentane will boil once heated causing the shell to expand to 6-8 times its original size. An example of expandable microspheres are the EXPANCEL® microspheres from AkzoNobel.

The expandable microspheres of the invention are typically powders and can come in unexpanded or expanded forms. For extruding foam from polymers that come in pellet form it is more convenient to have the blowing agent also be added in a pellet form. Therefore, it is desirable to prepare pellet concentrates, or masterbatches, containing microspheres by adding them to polymer carriers and use them for foam extrusion.

There are several processing advantages to forming a foam with expandable microspheres. There is less gas/polymer matrix interaction and thus concerns about the reduction of melt strength due to the dissolved gas is reduced. Compatibility of the blowing gas and polymer represented by its solubility, diffusivity and permeability are of much less concern. This allows one to decouple the cell initiation and growth phenomenon from polymer/gas compatibility. The temperature profile for the extruder would be more similar to the temperature profile used with the neat polymer extrusion and the processing window is wider than the other two forms of foaming technologies. The bubbles formed by the expanding gas typically do not burst and coalesce into large voids, as can happen in the other two foaming technologies. The cell size distribution of the foam is a function of the particle size distribution of the microsphere particles. Thus, particular care should be given to the combination of the temperature and residence time of the process, since keeping the mixture at high temperature for long time would cause the gas inside the formed bubbles to escape from their thin shell into the polymer matrix where the bubbles would collapse. The control of temperature and residence time of the process is critical to forming a good closed foam. Added nucleating agent is not necessary with the microspheres.

The microsphere foaming can be used in a continuous or batch foaming process, and can be expanded during or after polymerization of the (meth)acrylic syrup Chemical blowing agents can also be used in the (meth) acrylic syrup. Useful chemical blowing agents for the invention include those compatible with (meth)acrylic polymers and have similar degradation temperatures (220-240 C). In the case of a chemical blowing agent, the gas is created by decomposition of a chemical heated above its decomposition temperature. In the case of the physical blowing agent, gas is introduced into the polymer either directly or through evaporating a liquid foaming agent by heating it above its evaporation temperature. Chemical blowing agents are mainly used for higher density foams—down to 70% density reduction, while physical blowing agents can produce light foams—upwards of 10× density reduction.

The chemical blowing agent can be a solid or fluid. Useful blowing agents include, but are not limited to, azodicarbonamide, azodiisobutyronitile, sulfonylsemicarbazide, 4,4-oxybenzene, barium azodicarboxylate, 5-Phenyltetrazole, p-toluenesulfonylsemicarbazide, diisopropyl hydrazodicarboxylate, 4,4'-oxybis(benzenesulfonylhydrazide), diphenylsulfone-3,3'-disulfohydrazide, isatoic anhydride, N,N'-dimethyl-N,N'dinitroterephthalamide, citric acid, sodium bicarbonate, monosodium citrate, anhydrous citric acid, trihydrazinotriazine, N,N'-dinitroso-pentamethylenetetramine, and p-toluenesulfonylhydrazide, or include a blend two or more of said blowing agents. Mixtures of chemical blowing agents and/or chemical and physical blowing agents are also contemplated by the invention.

The level of blowing agent can be varied from 0.1-10% to achieve target density reduction. 40% density reduction can be achieved in a foamed acrylic rod (PLEXIGLA V045 resin, Arkema) when 0.5% of monosodium citrate is used as blowing agent with 10% process aid. (PLASTICSTRENGTH p566, Arkema) 33% density reduction can be achieved in a foamed acrylic sheet (Plexiglas V045 resin) with 0.6% sulfur hydrazine derivative as blowing agent and 5% process aid (Plastistrength P566). Acrylic sheets foamed with this method have a rough surface due to a wide distribution of cell sizes. The cell size and surface properties can be improved with the method described below.

Other Additives:

Other optional additives can be part of the liquid (meth) acrylic syrup. These additives include: an activator for the polymerization, fibers, colorants, fillers, carbon nanotubes, or graphite oxide, nanoparticles, which can be added to the monomer/initiator/blowing agent mix to achieve desired properties.

The content of the activator with respect to the to the (meth)acrylic monomer of the liquid (meth) acrylic syrup is from 100 ppm to 10,000 ppm (by weight), preferably from 200 ppm to 7000 ppm by weight and advantageously from 300 ppm to 4000 ppm.

In one embodiment, nanoparticles can be added to form thermally and/or electrically conductive thermoplastic nanocomposite foams. In this case, dry unexpanded microspheres and (meth)acrylic liquid resin may be combined with 1-20 wt % suitable high aspect ratio, conductive nanoparticles such as carbon nanotubes (GRAPHISTRENGTH, Arkema) or graphene, graphite nano particles, graphite oxide or boron nitride. The mixture may be initiated and polymerized in a ⅛" thick glass mold. Upon heating the sheet at 180 C for 15 mins, it may expand. Considering that the expandable microspheres expand by up to 10× the original diameter, the surface of the sphere may undergo up to 10,000% biaxial strain, which creates a flow field between adjacent expanding spheres. It is proposed that this flow field can induce uniaxial or biaxial orientation of conductive particles. The closed-cell morphology created by the microspheres may also encourage bicontinuous, percolating conductive networks. It follows that such composites may possess a morphology ideal for highly conductive networks. Electrically conductive foams are ideal low-density materials for applications requiring Electromagnetic Interference (EMI) shielding, such as packaging or electronics insulation.

In one embodiment, the liquid (meth)acrylic syrup of the invention can be used for impregnating fibers. The impregnation can occur in a mold—such as by vacuum infusion or wet compression molding, or by dipping, spraying or otherwise impregnating long fibers with the liquid (meth) acrylic syrup. The impregnated fibers are them polymerized and foamed.

Fibrous substrates of the invention include, but are not limited to mats, fabrics, felts or nonwovens that may be in the form of strips, laps, braids, locks or pieces. The fibrous material can have different forms and dimensions either one dimensional, two dimensional or three dimensional. A fibrous substrate comprises an assembly of one or more fibres. When the fibres are continuous, their assembly forms fabrics.

The one dimensional form is linear long fibers. The fibers may be discontinuous or continuous. The fibers may be arranged randomly or as a continuous filament parallel to each other. A fiber is defined by its aspect ratio, which is the ratio between length and diameter of the fiber. The fibers used in the present invention are long fibers or continuous fibers. The fibers have an aspect ratio of at least 1000, preferably at least 1500, more preferably at least 2000, advantageously at least 3000 and most advantageously at least 5000.

The two dimensional form are fibrous mats or non-woven reinforcements or woven roving or bundles of fibers, which can also be braided.

The three dimensional form are for example stacked or folded fibrous mats or non-woven reinforcements or bundles of fibers or mixtures thereof, an assembly of the two dimensional form in the third dimension.

The fibrous material can be natural or synthetic. Natural materials include, but are not limited to vegetable fibers, wood fibers, animal fibers or mineral fibers, for example sisal, jute, hemp, flax, cotton, coconut fibers, banana fibers, wool or hair.

Synthetic material includes, but is not limited to polymeric fibers that are thermosetting or thermoplastic polymers, or their mixtures. These include polyamide (aliphatic or aromatic), polyester, polyvinylalcohol, polyolefins, polyurethanes, polyvinylchloride, polyethylene, unsaturated polyesters, epoxy resins and vinylesters.

Mineral fibers are a preferred embodiment and include glass fibers especially of type E, R or S2, carbon fibers, boron fibers or silica fibers.

In one embodiment, the liquid (meth)acrylic syrup of the invention can be mixed with short fibers such as short glass fibers prior to foaming and polymerization. In this case, fiber impregnation in a mold would not be necessary. The fibers would have an aspect ratio of less than 5000, preferably less than 3000, more preferably less than 2000, advantageously less than 1500 and most advantageously less than 1000.

The fibrous material can be natural or synthetic. Natural materials include, but are not limited to vegetable fibers, wood fibers, animal fibers or mineral fibers, for example sisal, jute, hemp, flax, cotton, coconut fibers, banana fibers, wool or hair.

Synthetic material includes, but is not limited to polymeric fibers that are thermosetting or thermoplastic polymers, or their mixtures. These include polyamide (aliphatic or aromatic), polyester, polyvinylacohol, polyolefins, polyurethanes, polyvinylchloride, polyethylene, unsaturated polyesters, epoxy resins and vinylesters.

Mineral fibers are a preferred embodiment and include glass fibers especially of type E, R or S2, carbon fibers, boron fibers or silica fibers.

Processes:

The blowing agents can be incorporated into the acrylic monomers and left unexpanded or they expands in-situ during polymerization.

The blowing agents of the invention are added to the liquid (meth)acrylic syrup. The expandable microspheres are not added to the monomer alone, as higher viscosity is needed for a stable suspension.

The blowing agent can be triggered during or following polymerization of the (meth)acrylic monomer. In one embodiment, the initiator can be selected so the exotherm created during polymerization simultaneously initiates and cures the foam.

In another embodiment, the liquid (meth)acrylic syrup can be polymerized, followed by initiation of the foaming agent to produce a foam.

Foams and composite foams can be formed by typical processes, including but not limited to: vacuum infusion, wet compression molding, resin transfer molding, compression resin transfer mold, lay-up spray-up, filament winding and pultrusion.

In one embodiment, a multi-layer structure is formed, having at least one foam layer of the invention, combined with at least one non-foamed layer. This could be a foam-core structure in which a layer of foam is formed between two layers of a non-foamed material, which could be (meth)acrylic layers, or compatible polymers, such as styrenics.

Some examples of processes of the invention include the following examples. One of ordinary skill in the art could easily imagine other processes and variations of the invention, based on the examples provided. The Elium® liquid acrylic resins are a solution of 10 to 60 weight percent (meth)acrylic polymer dissolved in 40 to 90 weight percent of (meth)acrylic monomer(s).

a) In one embodiment, dry unexpanded Expancel® microspheres 950DU80 are dispersed in Elium® 190 with a lab shaker. The Elium®/Expancel® mixture is initiated with 1% Perkadox® 16 and polymerized in a ⅛" thick glass mold in the water bath at 61 C. A ⅛" thick translucent sheet is obtained with smooth and glossy surface.

Upon heating the sheet at 180° C. for 15 mins, it expands to 8-9 times its original volume. 90% density reduction can be obtained with 10 wt % Expancel 950 DU 80 microspheres. Note that the particles cannot stay dispersed in MMA as certain viscosity is needed to obtain a stable suspension, and Elium grades with 100 cP viscosity can hold up to 10 wt % particles.

Foamed PMMA sheets prepared with this method have incredibly uniform cell size (108±30 µm) and cell structure: there are no distinction between sheet surfaces/edges and center of the sheet. The foam sheet with 90% density reduction has k factor of 0.21 at 25 F. Compared to PU foams that have lower k factor (better at insulating heat) due to much higher density reduction, acrylic foam described in this invention have much smaller and narrower distribution of cell size.

b) A self-foaming PMMA-based liquid resin could also be formulated using a procedure similar to the process described in a). In this case, an Elium® resin/MMA/unexpanded Expancel® microsphere mixture is combined with a suitable radical initiator package, such that the ensuing reaction exotherm causes expansion of the Expancel® microspheres. Accordingly, the proposed PMMA-based liquid resin would foam and cure simultaneously. This formulation would require a dry unexpanded expancel microsphere with a low expansion temperature, such as Expancel 820 DU 40.

c) Thermoplastic composites with Expancel® un-expanded microspheres are prepared with ELIUM® resin through vacuum infusion and wet compression molding. In one experiment, 5 wt % unexpanded Expancel® microspheres are added to ELIUM® 150 and 2 wt % LUPEROX® AFR40 is used as the initiator. Using a standard vacuum infusion layup (i.e. peel ply, flow media, tacky tape and bag) the mixture was infused into a glass fiber mat reinforcement.

The process was performed at room temperature and left to cure at room temperature for ~45 minutes. Once cured, the composite laminated was demolded and cut into sections. One section was suspended in a 200° C. oven for 5 minutes to expand the Expancel® particles. Another section was placed into a preheated steel mold with a set cavity thickness of 0.100". The mold was placed into a hydraulic press and ~50 PSI was applied to close the mold and confine the expansion of the composite to only on plane. The production of a composite panel incorporating un-expanded particles (~5 wt %) using the wet compression molding process is successful. With a second heating stage, the Expancel particles expanded as intended and resulted in 40% density reduction in the ELIUM® composite part.

Uses:

Composite thermoplastic (meth)acrylic foam articles of the invention have many uses, as can be imagined by one of skill in the art based on the description and examples. The foam composites can be used to form parts for many uses, including but not limited to an automobile part, boat part, train part, sport article, plane part, helicopter part, space ship part, rocket part, photovoltaic module part, wind turbine part, furniture part, construction part, building part, telephone or cell phone part, computer or television part, printer part or photocopy part.

For use in packaging materials, unlike polyurethane foams, this foaming technology doesn't require hazardous diisocyanates, and does not produce hazardous VOCs. A liquid foamable syrup that doesn't have diisocyanates is desired for applications in electronics packaging.

EXAMPLES

Example 1: Using Expancel® Microspheres to Obtain Foamed Sheet 20 g of dry unexpanded Expancel® 950DU80 microspheres are dispersed in 180 g of Elium® 190 with a lab shaker for 30 mins at room temperature. Elium® 190 is a mixture of MMA and acrylic copolymer with a viscosity at 100 cP. Once dispersed, 2 g of Perkadox® 16 is hand-mixed into the Elium®/Expancel® mixture as initiator. The mix is then poured into a ⅛" thick glass mold and sealed. The mold is immersed and polymerized in the water bath at 61° C. for ~40 minutes. A ⅛" thick translucent sheet is obtained with smooth and glossy surface. The sheet is cut into 2" by 2" pieces and suspended in an air oven at 180° C. for 15 mins to expand the Expancel® microspheres. A 4" by 4" foamed sheet can be obtained using this condition with a thickness of ¼". The foamed sheet has 90% density reduction with uniform cell size (108±30 μm) and k factor of 0.21 at 25 F.

Example 2: Using Expancel® Microspheres to Obtain Composite Part Via Vacuum Infusion 15 g of dry unexpanded Expancel® 920DU20 is added to 285 g of Elium® 150 and mixed on a lab shaker for 30 minutes at room temperature. Once dispersed, Luperox® AFR40 is added to the mix at 6 g as initiator. Using a standard vacuum infusion layup (i.e. peel ply, flow media, tacky tape and bag) the mixture was infused into a glass fiber mat reinforcement. The process was performed at room temperature and left to cure at room temperature for ~45 minutes. Once cured, the composite panel is cut into 1"×1" sections. Once section was suspended in a 200° C. air oven to expand the Expancel® microspheres. Another section was placed into a preheated steel mold with a set cavity thickness of 0.100". The mold was placed into a hydraulic press and ~50 PSI was applied to close the mold and confine the expansion of the composite to only on plane. The density reduction obtained for both expansion methods is 30-40%.

Example 3: Using Expancel® Microspheres to Obtain Composite Part Via Liquid Compression Molding 3.3 g of dry unexpended Expancel® 031DU40 microspheres are hand-mixed into 63.2 g of Elium® 150 at room temperature. In a subsequent step, 1.3 g of Luperox® AFR40 is added to the mix as initiator. A mold is set up with two ⅛" steel plates sandwiching a circular rubber spacer with 3.5 mm diameter, and a round-shaped PPG MatVantage II chopped, stitched glass fiber mat is laid inside the rubber ring in between the steel plates. The mold is opened to pour the mixture onto the fibrous mat, and the mixture is spread evenly with a wooden tongue depressor. The mold is then placed into a hydraulic press pre-heated to 60° C., and pressure is applied gradually from 100 PSI to 6000 PSI during the cure profile. After ~10 minutes, the composite panel is cured and cut into 1" by 1" sections. One section is suspended in an air oven pre-heated to 180° C. Another section is expanded with the same method but cooled down in a room temperature hydraulic press with ~50 PSI applied to minimize expansion in the z-direction. The density reduction is around 20-32%, and much smoother/glossier surface can be obtained when the composite part is compressed while cooling down. The formed part is shown in FIG. 1, right side.

Example of Method to Achieve "Class A" Surface:

The ELIUM®resin/Expancel® composite part as above, is cured in a mold cavity. Once cured, the mold is opened slightly to allow for some free volume. The mold is then heated to the point in which Expancel® particles will begin to expand. This expansion effectively pushes the resin against the tool cavity walls. The mold is then cooled, to stabilize the part, and demolded.

The formed part is shown in FIG. 1, left side.

A variation of the above process involves forming the composite part in the mold, followed by de-molding and transferring to another mold with slightly bigger gap (such as 0.5 mm globally), the part is then heated either in the mold, or prior to closing the mold. The mold is then closed to compress the part within the mold to achieve thickness uniformity. Examples of a part from the unopended mold, and a part formed by first molding, followed by a slight mold-opening and further expansion.

This process involving mold opening and foaming, or mold transfer, would also for a melt-processed part.

What is aspected is:

1. A process for forming a (meth)acrylic foam comprising the steps of
    a. blending a foaming agent, (meth)acrylic monomers, (meth)acrylic polymer and one or more initiators to form a liquid (meth)acrylic syrup having a dynamic viscosity in the range from 10 mPa*s to 10000 mPa*s, wherein the foaming agent comprises expandable microspheres,
    b. forming a structure by polymerization of the liquid (meth)acrylic syrup
    wherein at least 50 wt% of the (meth)acrylic monomers is methyl methacrylate, wherein said structure is foamed after the polymerization by the addition of energy capable of enabling the foaming agent to expand, or wherein foaming occurs simultaneously with the polymerization process, to form a foamed structure, wherein said liquid (meth)acrylic syrup is combined with fibers by impregnating said fibers before polymerization, said fibers are chosen from long fibers with an aspect ratio of the fiber of at least 1000 or from a fibrous material having a two or three dimensional macroscopic structure, wherein said combination of long fibers and liquid (meth)acrylic syrup occurs by Gravure coating, immersion dip coating, slot die coating, curtain coating, or gap coating.

2. The process of claim 1, wherein foaming occurs simultaneously with the polymerization process, to form a foamed structure.

3. The process of claim 1, wherein said structure is foamed after polymerization by the addition of energy capable of enabling the foaming agent to expand.

4. The process of claim 1, wherein said structure formation is performed by, cell cast, solid state casting, vacuum infusion, pultrusion, wet compression molding, resin transfer molding, compression resin transfer molding, lay-up/spray-up; or filament winding.

\* \* \* \* \*